United States Patent

Schuller

[15] 3,677,196
[45] July 18, 1972

[54] COVERED HOPPER CAR
[72] Inventor: James J. Schuller, Dolton, Ill.
[73] Assignee: Pullman Incorporated, Chicago, Ill.
[22] Filed: Dec. 19, 1969
[21] Appl. No.: 886,506

[52] U.S. Cl..................................105/377, 52/45, 292/175
[51] Int. Cl............................................................B61d 39/00
[58] Field of Search....................105/377; 52/45, 60; 16/47; 292/175

[56] References Cited

UNITED STATES PATENTS

| | | | |
|---|---|---|---|
| 3,461,818 | 8/1969 | Sanders et al. | 105/377 |
| 1,404,557 | 1/1922 | Stahl | 292/175 |
| 1,689,101 | 10/1928 | Beck | 292/175 |
| 1,675,591 | 7/1928 | Bell | 292/175 |

Primary Examiner—Drayton E. Hoffman
Assistant Examiner—Richard A. Bertsch
Attorney—Hilmond O. Vogel and Wayne Morris Russell

[57] ABSTRACT

A covered hopper car having an open car body pivotally supporting between opened and closed positions a releasably lockable roof which may be hinged from either side while the other side is unhinged attendant to dumping a load through the open roof car body, the car body having mounted on each of its sides a plurality of releasable locking hinges connected to respective hinge structures on each of the car roof sides, each car body releasable hinge being provided with release plungers biased to the locked position and releasable by car rotating structure whereby one side of the roof moves away from the car during rotation and the other side remains hinged to permit the contents in the car body to fall outwardly therefrom.

4 Claims, 5 Drawing Figures

Patented July 18, 1972

Inventor
James J. Schuller

By *Richard J. Myers*
Attorney

Inventor
James J. Schuller
By Richard J. Myers
Attorney

COVERED HOPPER CAR

SUMMARY

It is the general object of this invention to provide for a pivotal releasable roof structure for a covered hopper car.

Another object of this invention is to provide for a covered hopper car having a releasably lockable roof wherein there is provided means for releasing one side edge of the roof from the associated side edge of the car body in pivoting the car body 180° attendant to dumping the contents out of the top of the car whereby the other side of the roof remains pivotally connected to the other side of the car body in order to pivot thereabout attendant to opening of the car roof for dumping of the contents from the hopper car.

Another object of this invention is to provide for a covered hopper car having locked releasing means releasable by a rotary hopper car dump fixture swinging the roof of the car away from the car body.

DETAILED DESCRIPTION

Figure 1:
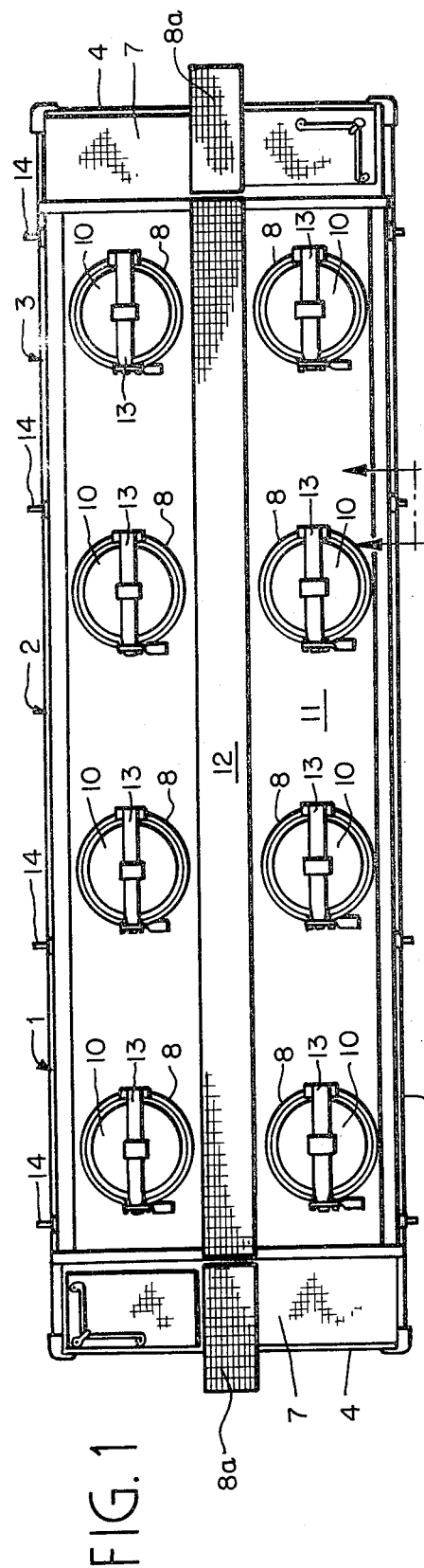
FIG. 1 is a top plan view of a covered hopper car.
Figure 2:
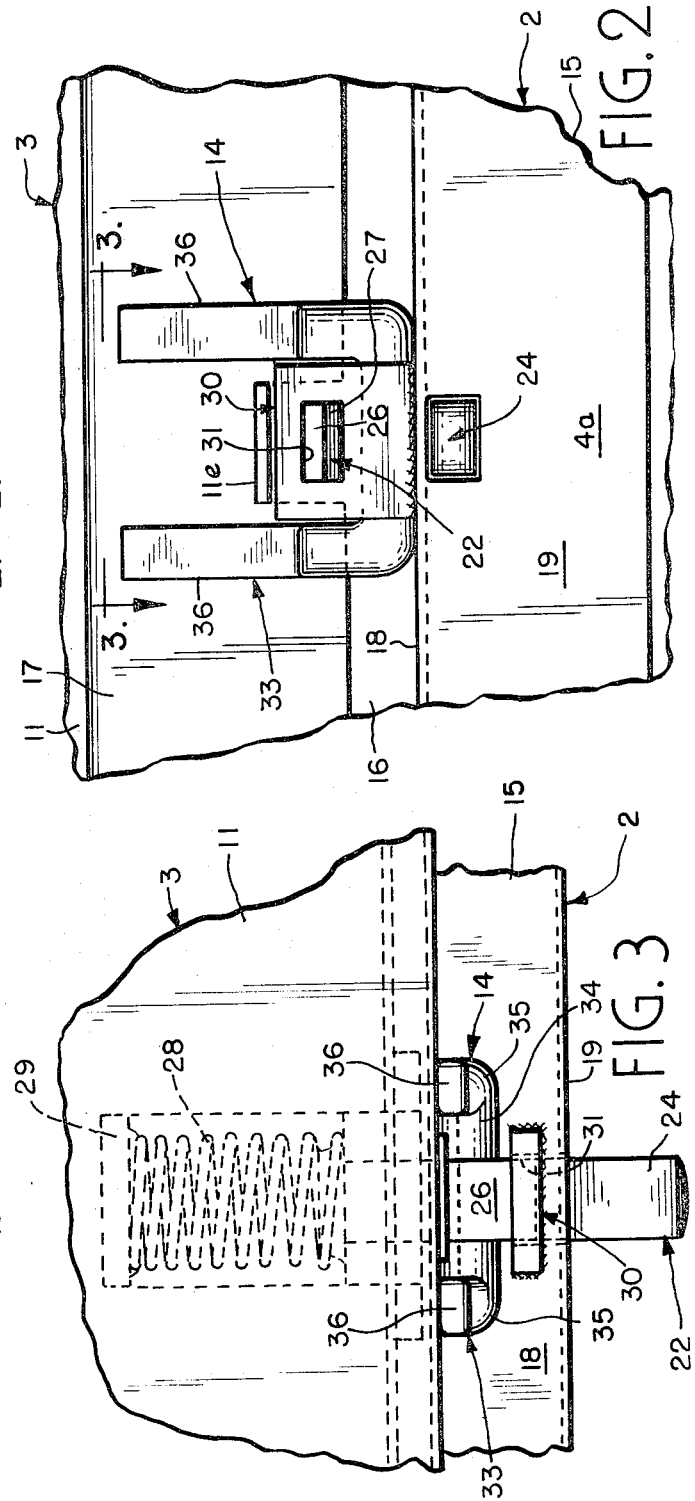
FIG. 2 is a side sectional view taken along line 2—2 of FIG. 1.
Figure 3:
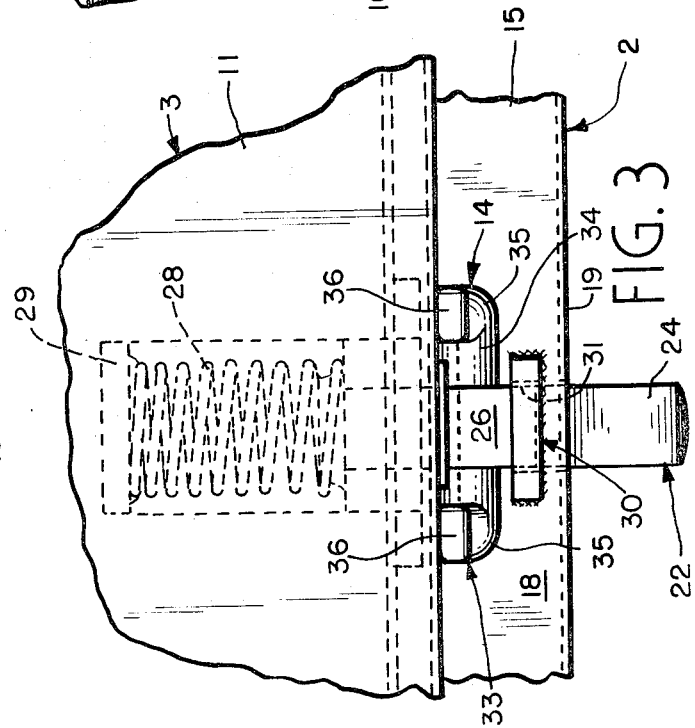
FIG. 3 is a top plan sectional view taken along line 3—3 of FIG. 2.

In reference now to the Figures, there is shown a hopper car 1 for carrying bulk material such as wet ore. The hopper car is provided with a car body 2 and a hopper car pivotal roof section 3. The car body 2 has end walls 4 and side walls 4a and an interior 5. The top of the car body 2 is provided with top car portions 7 having running board sections 8a. The roof section 3 is provided with a plurality of circular hatch means 8 which include a hatch cover 10. The roof is further provided with a roof top wall 11 on which is provided roof runner portions 12. Hatch tie-down means 13 are provided for holding the hatch means 8 to the roof.

The invention comprises a plurality of releasably locking hinge means 14 extending longitudinally on each side of the car for releasably and pivotally connecting a respective side of the roof with a respective side of the car body.

Figure 4:
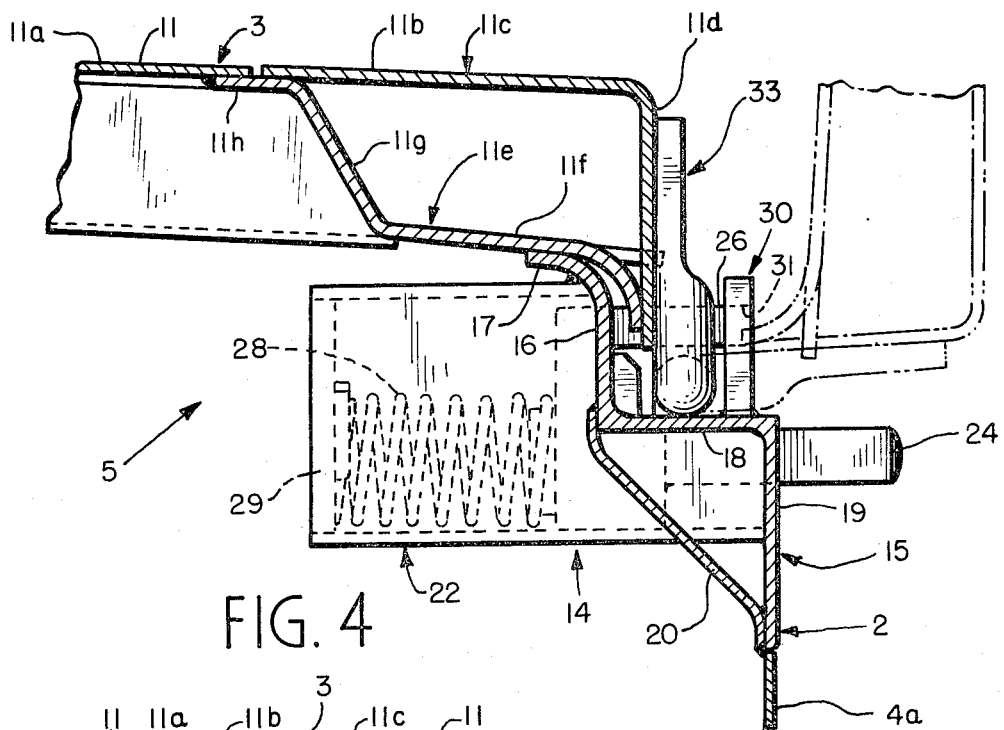
FIG. 4 is a cross-sectional view of the connecting portions of the roof and car body in the closed position with dotted line position illustrating the hinging of the roof.
Figure 5:
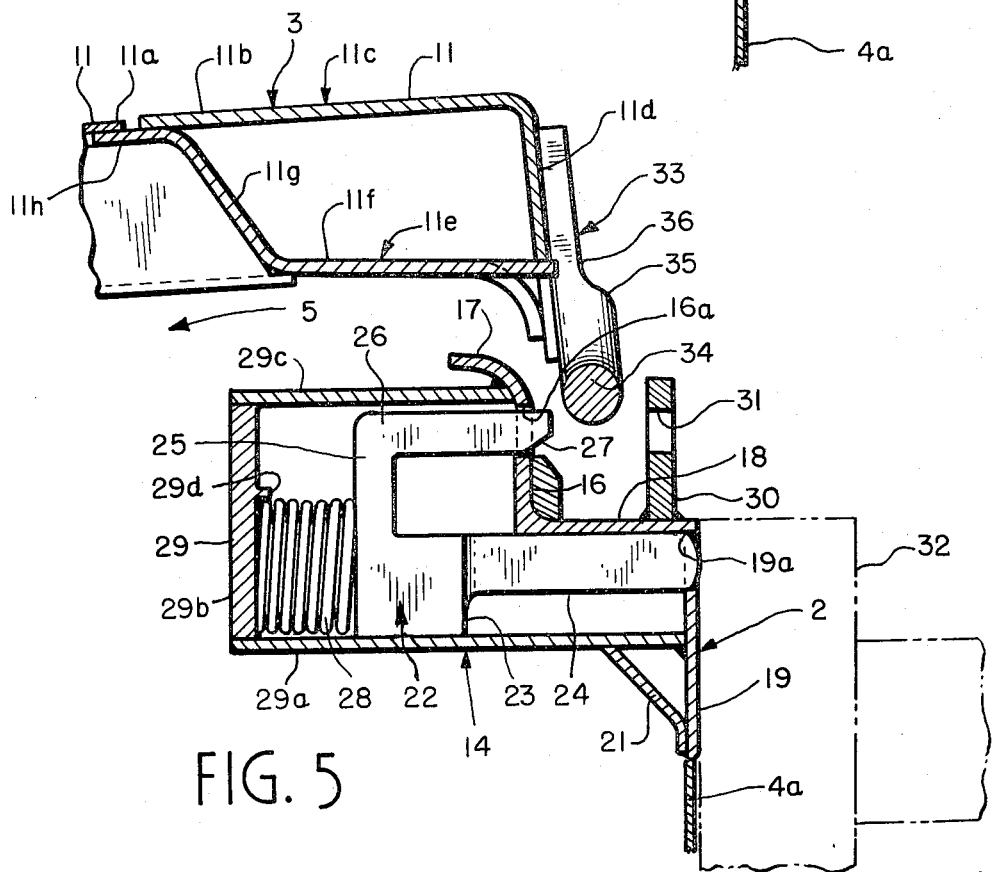
FIG. 5 is a view similar to FIG. 4 but with the roof being separated from the car body to illustrate the open position.

With reference to FIGS. 4 and 5, the roof top wall 11 includes an upper or top central roof wall section 11a and side roof section 11c connecting with the roof section 11a and having a horizontal portion 11b and a vertical downwardly extending portion 11d. The roof section 11c is spaced above and connected with roof section 11e which includes a horizontal side portion 11f that is spaced below section 11b and has a slight upward taper to join with steep sloped roof sheet 11g which in turn is connected with inner or central roof section 11h being attached with sections 11a and 11b. The section 11c which is attached to the rest of the roof section acts to carry the hinge pin structure of the releasably locking hinge means 14 as will be explained below. The car body is provided on each side with a side plate structure 15 which includes an upper vertical side plate portion 16 having a free upper curved end 17 attached to the underside of roof section 11f. The side plate structure 15 further includes a horizontal plate portion 18 connecting with the upright portion 16 and with a lower depending vertical plate portion 19. The side plate structure 15 is reinforced by inner diagonal reinforcing plate 20 adjacent the hinged means 14 and to the hinged means 14 by reinforcing plate 21. The upright side plate portion 16 is provided with an aperture 16a and the lower vertical plate portion 19 is provided with an aperture 19a.

The releasable locking hinged means 14 comprises a latched structure 22 having a base boss 23 extending lengthwise of the car and having a plunger 24 extending transversely therefrom and along the underside of the horizontal plate portion 18 and reciprocally outwardly of the aperture 19a. Extending from the boss or base member 23 is a vertical arm 25 from which projects at the top thereof and outwardly to the side of the upper latch arm 26 reciprocably extendable through the aperture 16a, the arm 26 at its lower outer end provided with tapered surface 27. A spring 28 is compressed between the back of boss 23 and the housing 29 and includes a lower horizontal housing plate 29a supporting the latched structure 22 and the spring 28. The housing portion 29b extends upwardly from the rear of the housing plate 29a and connects with an overhead horizontal housing portion 29c connecting with the side plate portion 17. The housing is provided with a spring retainer tab 29d on the wall 29b, the spring 28 urging the plunger 24 outwardly of the housing and out of the aperture 19a. A latch plate 30 is mounted in upright position on the horizontal side plate portion 18 and is provided with an aperture 31 for receiving upper latch arm 26 therethrough. The upper end of the plunger 24 is acted on by the fixture or rotary dumper positioner arm 32 on the car dumper to force the plunger into the housing 29 for releasing the hinged pin 33 from its entrapment between upper latch arm 26 of the latch mechanism 22. The hinged pin 33 includes a horizontal rung portion 34 entrained between latch arm 26 in FIG. 4 and released thereby in FIG. 5 and further is provided with a pair of upright arms 36 connecting with the ends of the horizontal rung 34. The arms 36 are connected to the outside roof section 11d.

Thus it is seen that there is provided a novel hinging and locking arrangement for pivotally attaching the hopper roof to the top of the car body. In the locked condition the roof is held fixed on the car body by the locking mechanism 14. When the car is rotated 180° from an upright position, the pusher arm 32 of the rotary dumper positions the plunger 24 inwardly of each of the locking and hinging mechanisms 14 whereby the free side section of the roof swings inwardly by gravity about the coupled side of the roof with the respective side of the car body.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

I claim:

1. A covered hopper car having an open car body portion having a pair of upper side plates, a removable releasably lockable pivotal roof mounted on said side plates, releasably locking and hinging means including a plurality of hinge lock structures pivotally connecting each side of the roof with a respective side plate, each lock and hinge means being spaced longitudinally of one another along the sides of the car, each of said lock and hinge structures comprising:

hinge pin means including a pair of upright longitudinally spaced-apart arms connected to the side of the roof and a lower generally horizontally extending latch engaging pin portion connecting with said upright hinge arms and extending below the roof side, a car body hinge structure mounted on said side plate and including a housing, a latch member in the housing, spring means in the housing and engaging the latch member for urging the latch member outwardly of the side of the car, said latch member including a base slidable in the housing and a laterally extending plunger reciprocable outwardly of the side of the car through an aperture in the side plate, a vertical arm portion connecting with the base and having an upper horizontally projecting latch arm reciprocably extendable through a second aperture in the side plate, an upright latch plate mounted on the side plate and spaced laterally outwardly of the housing and having an aperture for the latch arm whereby the spring means urges the latch arm through the vertical side plate aperture and the laterally spaced upright latch plate aperture attendant to confining the roof hinge pin portion therein and said upper latch arm releasing said roof hinge pin portion upon depression of said plunger inwardly of the housing by associated hopper rotating means.

2. In a hopper car a locking and hinge structure for coupling the roof of the hopper car to the top of the hopper car body side plate including:
   a roof hinge pin depending from the side of the roof and a latch housing mounted on the car body side plate,
   a latch member and spring-like means mounted in the housing and urged by the spring outwardly of the housing,
   a latch plate laterally outward of the housing,
   the latch member including a guided plunger adapted to be moved inwardly by a hopper rotation mechanism and a locking latch arm connecting with the plunger and extendable out of the side plate and through an opening in the upright latch plate to confine the roof hinge pin therein.

3. The invention according to claim 2, and said hinge pin including a pair of upright longitudinally spaced-apart arms connected to the side of the roof and a lower pin portion connecting with the upright arms.

4. A locking and hinge structure for coupling the roof of the hopper car to the top of the hopper car body side plate including:
   a roof hinge pin depending from the side of the roof and a latch housing mounted on the car body side plate,
   a latch member and spring mounted in the housing and urged by the spring outwardly of the housing,
   a latch plate laterally outward of the housing,
   the latch member including a plunger adapted to be moved inwardly by a hopper rotation mechanism and an upper locking latch arm extendable out of the side plate and through an opening in the upright latch plate to confine the roof hinge pin therein,
   said roof including an angle portion attached thereto having an upright portion for attachment of the depending roof hinge pin thereto to juxtaposition the pin with respect to the locking means.

* * * * *